United States Patent
Radu

(10) Patent No.: US 7,265,306 B2
(45) Date of Patent: Sep. 4, 2007

(54) FLIP PACK SWITCH ASSEMBLY WITH ELECTROLUMINESCENT LAMP AND INJECTION MOLDING METHOD OF MAKING SAME

(76) Inventor: Bodgan Radu, 16011 Knollwood Dr., Dearborn, MI (US) 48120

( * ) Notice: Subject to any disclaimer, the term of this patent is extended or adjusted under 35 U.S.C. 154(b) by 0 days.

(21) Appl. No.: 10/711,385

(22) Filed: Sep. 15, 2004
(Under 37 CFR 1.47)

(65) Prior Publication Data
US 2006/0054482 A1    Mar. 16, 2006

(51) Int. Cl.
*H01H 9/00* (2006.01)
(52) U.S. Cl. .............. 200/310; 200/314; 200/317; 200/333; 200/61.62
(58) Field of Classification Search ......... 200/5 R, 200/43.22, 61.62, 61.7, 61.81, 333, 61.73, 200/310, 317; 296/152, 153; 297/411.2; 307/9.1, 10 R, 10.1
See application file for complete search history.

(56) References Cited

U.S. PATENT DOCUMENTS

| | | | |
|---|---|---|---|
| 2,083,753 A | 6/1937 | Turner | |
| 2,851,585 A | 9/1958 | Glowzinski | 240/2 |
| 4,104,555 A | 8/1978 | Fleming | |
| 4,602,358 A * | 7/1986 | Sato | 369/12 |
| 4,619,624 A | 10/1986 | Kerr, III et al. | 445/22 |
| 4,670,819 A | 6/1987 | Boerema et al. | 362/80 |
| 5,013,967 A | 5/1991 | Hirotaka et al. | |
| 5,064,974 A * | 11/1991 | Vigneau et al. | 200/61.62 |
| 5,158,353 A | 10/1992 | Kimisawa | |
| 5,193,895 A | 3/1993 | Naruke et al. | |
| 5,434,013 A | 7/1995 | Fernandez | 428/690 |
| 5,434,757 A * | 7/1995 | Kashiwagi | 362/501 |
| 5,452,190 A * | 9/1995 | Priesemuth | 362/255 |
| 5,780,965 A | 7/1998 | Cass et al. | 313/506 |
| 5,811,930 A | 9/1998 | Krafcik et al. | 313/510 |
| 6,000,822 A | 12/1999 | Polizzi et al. | 362/488 |
| 6,013,956 A | 1/2000 | Anderson, Jr. | 307/10.1 |

(Continued)

FOREIGN PATENT DOCUMENTS

DE    4141297    6/1993

(Continued)

OTHER PUBLICATIONS

Bogdan Radu et al., U.S. Appl. No. 10/711,636, filed Sep. 29, 2004.

(Continued)

*Primary Examiner*—Michael A. Friedhofer
(74) *Attorney, Agent, or Firm*—Wood, Herron & Evans, L.L.P.

(57) ABSTRACT

A switch flip pack for the interior of an automobile comprising a door trim panel with a switch panel carrying at least one electrical switch, a flip cover pivotally attached to the switch panel, and a electroluminescent lamp mounted to the flip cover. The flip cover has an opened position in which the electrical switch is accessible and a closed position in which the electrical switch is inaccessible. When energized, the electroluminescent lamp is positioned for emitting visible light to illuminate the electrical switch when the flip cover is in the opened position. A method is also provided for forming the flip cover and electroluminescent lamp by an injection molding process.

9 Claims, 3 Drawing Sheets

U.S. PATENT DOCUMENTS

| | | | |
|---|---|---|---|
| 6,116,672 A | 9/2000 | Cannon et al. | 296/37.13 |
| 6,139,304 A * | 10/2000 | Centofante | 425/121 |
| 6,160,475 A | 12/2000 | Hornung et al. | 340/461 |
| 6,193,399 B1 | 2/2001 | Hulse | 362/511 |
| 6,196,606 B1 | 3/2001 | McGoldrick | 296/37.13 |
| 6,217,201 B1 | 4/2001 | Hulse | 362/511 |
| 6,286,983 B1 | 9/2001 | Macher et al. | 362/487 |
| 6,315,436 B1 | 11/2001 | Schenk et al. | 362/488 |
| 6,419,379 B1 | 7/2002 | Hulse | 362/488 |
| 6,464,381 B2 | 10/2002 | Anderson, Jr. et al. | 362/488 |
| 6,536,825 B2 * | 3/2003 | McAndrew et al. | 296/37.13 |
| 6,536,928 B1 | 3/2003 | Hein et al. | 362/464 |
| 6,545,418 B1 | 4/2003 | Kolpasky et al. | |
| 6,594,417 B1 | 7/2003 | Hulse | 385/31 |
| 6,641,276 B1 | 11/2003 | Macher et al. | |
| 6,652,128 B2 | 11/2003 | Misaras | 362/488 |
| 6,656,397 B1 | 12/2003 | Hansen et al. | 264/45.4 |
| 6,746,067 B2 * | 6/2004 | Schmidt et al. | 296/37.13 |
| 6,786,614 B2 | 9/2004 | Ciarrocchi, Jr. | |
| 6,945,581 B2 * | 9/2005 | Taylor | 296/37.8 |
| 2001/0030871 A1 | 10/2001 | Anderson, Jr. et al. | 362/488 |
| 2001/0053082 A1 | 12/2001 | Chipalkatti et al. | 362/496 |
| 2003/0002273 A1 | 1/2003 | Anderson, Jr. et al. | 362/84 |
| 2003/0031330 A1 | 2/2003 | Kim | |
| 2003/0048912 A1 | 3/2003 | Reich | |
| 2004/0017687 A1 | 1/2004 | Misaras | 362/489 |
| 2004/0108606 A1 | 6/2004 | Goggins | |
| 2004/0175014 A1 | 9/2004 | Liu | |
| 2005/0002199 A1 | 1/2005 | Stuffle et al. | |
| 2005/0140167 A1 | 6/2005 | Jaggi | |

FOREIGN PATENT DOCUMENTS

| | | |
|---|---|---|
| DE | 19518169 | 11/1996 |
| DE | 29719025 | 12/1997 |
| DE | 298 08 949 U1 | 7/1998 |
| DE | 199 10 973 | 10/2000 |
| DE | 10010088 | 6/2001 |
| DE | 10129021 | 9/2002 |
| DE | 101 51 704 | 10/2003 |
| DE | 10240270 | 3/2004 |
| DE | 20 2004 002 786 U1 | 6/2004 |
| DE | 103 16 678 B3 | 8/2004 |
| DE | 10314352 A1 | 10/2004 |
| DE | 10335868 | 3/2005 |
| DE | 10338898 | 3/2005 |
| DE | 10341253 A1 | 4/2005 |
| DE | 60012295 T2 | 8/2005 |
| DE | 202005009668 | 10/2005 |
| EP | 1298007 | 4/2003 |
| EP | 1 188 615 A3 | 6/2004 |
| EP | 1110822 B1 | 7/2004 |
| EP | 1448027 A1 | 8/2004 |
| FR | 2838669 | 10/2003 |
| JP | 57194126 | 11/1982 |
| JP | 9086273 | 3/1997 |
| JP | 9097026 | 4/1997 |
| JP | 11162633 | 6/1999 |
| JP | 2000344011 | 12/2000 |
| JP | 2002046529 | 2/2002 |
| JP | 2002096691 A | 4/2002 |
| JP | 2003086354 | 3/2003 |
| WO | WO98/57097 | 12/1998 |
| WO | WO 01/63172 | 8/2001 |
| WO | 03101779 A2 | 12/2003 |

OTHER PUBLICATIONS

Bogdan Radu et al., U.S. Appl. No. 10/711,652, filed Sep. 29, 2004.
Bogdan Radu et al., U.S. Appl. No. 10/711,480, filed Sep. 21, 2004.
Bogdan Radu et al., U.S. Appl. No. 10/711,462, filed Sep. 20, 2004.
Bogdan Radu et al., U.S. Appl. No. 10/711,463, filed Sep. 20, 2004.
European Patent Office, Search Report issued in Corresponding Application No. GB0521216.2, Date of Search: Mar. 27, 2006.
United States Patent and Trademark Office, Office Action mailed May 9, 2006 in related U.S. Appl. No. 10/711,462.
German Patent Office, Office Action mailed May 5, 2006 in corresponding German Application No. 10 2005 043 901.2-42.
United States Patent and Trademark Office, Notice of Allowance and Fee(s) Due mailed May 25, 2006 in related U.S. Appl. No. 10/711,636.
Dipl.-ing. Ropling; German Patent and Trademark Office, Office Action dated May 18, 2006 (4 pages).
US Patent and Trademark Office, Office Action issued in related U.S. Appl. No. 10/711,480, dated Nov. 8, 2006.
US Patent and Trademark Office, Office Action issued in related U.S. Appl. No. 10/711,462, dated Oct. 17, 2006.
UK Patent Office, Examination Report Issued in Corresponding UK Application No. GB0518379.3 dated Sep. 22, 2006 (1 page).
U.S. Patent and Trademark Office, Office Action Dated Sep. 27, 2006 in related U.S. Appl. No. 10/711,463.
Dipl.-ing. Gottstein, German Patent and Trademark Office, Office Action Dated Aug. 2, 2006 in related German Application No. 10 2005 052 533.4 (4 pages).
Dipl.-ing. Gottstein, German Patent and Trademark Office, Office Action Dated Aug. 2, 2006 in related German Application No. 10 2005 052 534.2-42 (3 pages).
Dipl.-ing. Univ. Stefan Geisenberger, German Patent and Trademark Office, Office Action Dated Jun. 7, 2006 (3 pages).
US Patent and Trademark Office, Office Action issued in related U.S. Appl. No. 10/711,462 dated Dec. 19, 2006.
German Patent Office, *Office Action Dated Sep. 21, 2005*, Untranslated (4 pages).
The UK Patent Office, *Search Report Issued in GB0518067.4*, Date of Search: Nov. 29, 2005.
The UK Patent Office, *Search Report from GB0518379.3*, Date of Search: Nov. 24, 2005.
The UK Patent Office, *Search Report from GB0521213.9*, Date of Search: Jan. 18, 2006.
The UK Patent Office, *Search Report Issued in GB0521210.5*, Date of Search: Jan. 20, 2006.
The UK Patent Office, *Search Report Issued in GB0518374.4*, Date of Search: Dec. 1, 2005.
Truong, Bao Q., United States Patent and Trademark Office, Office Action Mailed Jun. 23, 2006 in related U.S. Appl. No. 10/711,480.

* cited by examiner

FLIP PACK SWITCH ASSEMBLY WITH ELECTROLUMINESCENT LAMP AND INJECTION MOLDING METHOD OF MAKING SAME

CROSS-REFERENCE TO RELATED APPLICATIONS

This application is related to U.S. patent application Ser. No. 10/711,462 filed Sep. 20, 2004, now pending in the U.S. Patent and Trademark Office and U.S. patent application Ser. No. 10/711,463 filed Sep. 20, 2004, now pending in the U.S. Patent and Trademark Office and U.S. patent application Ser. No. 10/711,480 filed Sep. 21, 2004, now pending in the U.S. Patent and Trademark Office and U.S. patent application Ser. No. 10/711,636, filed Sep. 29, 2004, now pending in the U.S. Patent and Trademark Office, and U.S. patent application Ser. No. 10/711,652 filed Sep. 29, 2004, now pending in the U.S. Patent and Trademark Office.

FIELD OF THE INVENTION

The present invention pertains generally to automotive interiors and more particularly to flip pack switch assemblies for automotive interiors.

BACKGROUND OF THE INVENTION

Vehicle door constructions typically feature a metal door frame with a sheet metal outer panel or skin that defines the door's exterior and an inner sheet metal panel secured to the door frame. Various door components, including window regulator rails, audio speakers, latches, and the like, are fastened in openings defined in the inner sheet metal panel. Covering the inner door panel is a removable trim panel that provides an aesthetically pleasing facade viewed by occupants seated in the passenger cabin of the motor vehicle. Controls are provided on the trim panel for devices such as seats, door locks, mirror and windows. The door latch is connected by a cable to an inner release handle on the trim panel accessible to the vehicle occupant.

Electrical switches may be provided on the door trim panel that operate the power door locks, adjust the passenger seats, open and close vehicle windows, and adjust the side view mirrors. In one type of construction, the electrical switches are arranged in a flip pack having a stationary switch panel and a hinged cover joined with the switch panel. The switch panel carries electrical switches that are infrequently used, such as seat switches, and the hinged cover carries electrical switches that are more frequently used, such as window switches. Normally, the hinged cover is pivoted to cover the switch panel so that the more frequently used electrical switches carried by the cover are visible. To access the less frequently used electrical switches, the cover is pivoted to reveal the electrical switches on the switch panel.

The electrical switches on the cover are illuminated with multiple discrete point light sources, such as light emitting diodes or incandescent bulbs, in the bolster that are aimed at different portions of the upper surface of the cover so as to uniformly illuminate the electrical switches. Similarly, the underside of the cover includes multiple discrete point light sources that are aimed at different portions of the switch panel. The illumination from the point light sources makes the electrical switches more visible under low-lighting conditions, such as early evening or dusk, and darkness caused by storms during the daytime and the like. However, this type of lighting construction requires a large number of components in an intricate assembly. Moreover, the aimed beams of the point light sources may be blocked by a person's hand when the switches are manually actuated so that the advantage gained by lighting the electrical switches of the flip pack is lost.

What is needed therefore is a lighting construction for flip panels that improves on conventional lighting constructions for flip packs.

SUMMARY OF THE INVENTION

In an embodiment of the invention, an automotive interior component comprises a door trim panel including a switch panel carrying at least one electrical switch, a flip cover pivotally attached to the switch panel, and a electroluminescent lamp mounted to the flip cover. The door trim panel is capable of being mounted to the vehicle door. The flip cover has an opened position in which the electrical switch is accessible and a closed position in which the electrical switch is inaccessible. The electroluminescent lamp is positioned for emitting visible light, when powered, to illuminate the electrical switch on the switch panel when the flip cover is in the opened position.

In another embodiment of the invention, a method is provided for making an automotive interior component in a mold with a pair of half sections that form a mold cavity with a geometrical shape resembling a flip cover for a flip pack and a gate for filling the mold cavity. The method includes placing an electroluminescent lamp between the half sections of the mold, closing the mold half sections and injecting a molten polymer resin through the gate to fill a portion of the mold cavity unfilled by the electroluminescent lamp, and opening the mold half sections after the molten polymer resin solidifies and ejecting the automotive interior component having the geometrical shape of the flip cover from the mold.

These and other objects and advantages of the invention shall become more apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
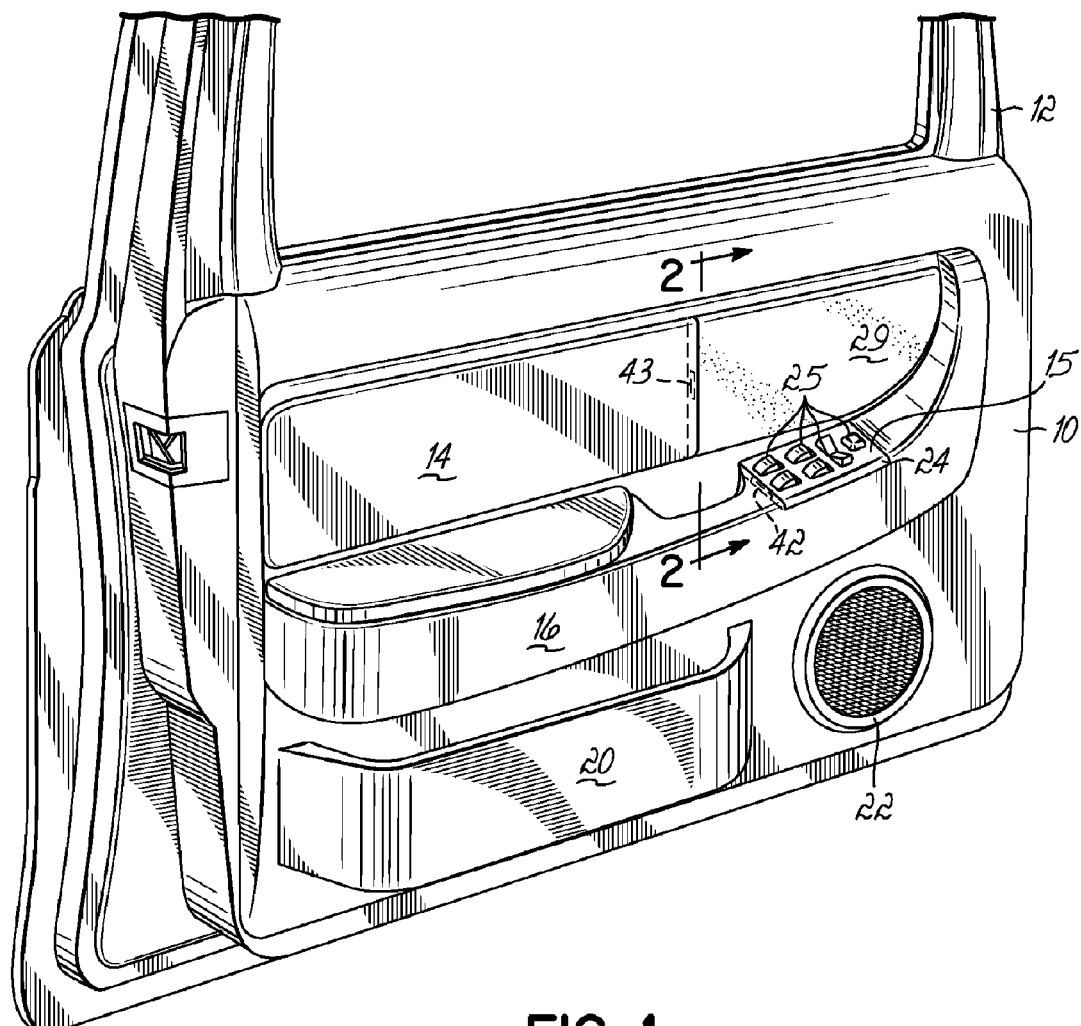
FIG. 1 is a perspective view of a door trim panel fastened to a vehicle door frame and including a flip pack of the present invention.
Figure 2:
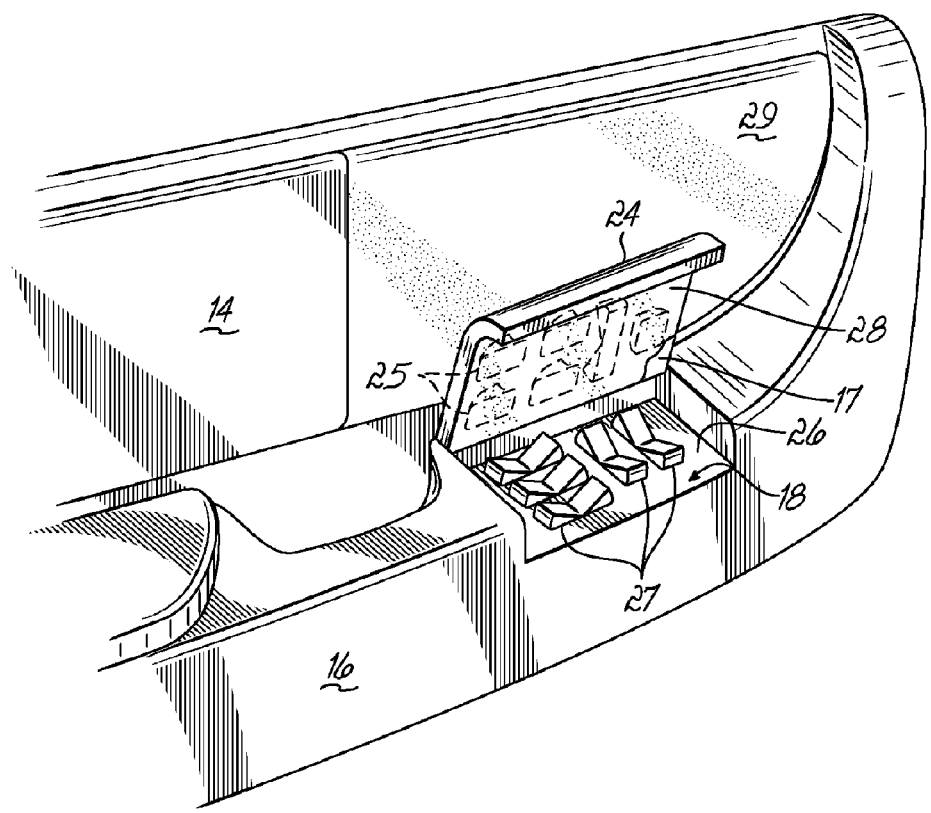
FIG. 2 is a view similar to FIG. 1 in which the cover of the flip pack is pivoted to an opened position.

With reference to FIGS. 1 and 2, a door trim panel 10 constructed in accordance with an embodiment of the invention is shown fastened to a door of a vehicle such as, for example, an automobile, a truck, or an aircraft. More specifically, door trim panel 10 is coupled as an assembly with the inner sheet metal of a door frame 12, which has a hinged attachment with a body of an automobile. The trim panel 10 may be attached to the door frame 12 by suitable fasteners (not shown) as is well known in the art. Persons of ordinary skill in the art will appreciate that door trim panel 10 may be used on other door assemblies including but not limited to sliding doors, hatches, etc. Further, persons of ordinary skill in the art will also appreciate that door frame 12 may be constructed of other materials such as composites like fiberglass and carbon fibers. A passenger occupying the passenger cabin of the automobile can manually move the assembled door relative to the body for passenger ingress and egress of the passenger cabin.

The door trim panel 10 includes a bolster 14 covering an access opening to the open space between the trim panel 10 and the door frame 12, an armrest 16, a flip pack 18 mounted to the arm rest 16, a map pocket closeout 20, and a speaker grille 22 that covers an audio speaker (not shown). The flip pack 18 includes a flip cover 24 with an upper surface 15 that carries a plurality of electrical switches 25 and a switch panel 26 (FIG. 2) carrying another plurality of electrical switches 27. The electrical switches 25, 27 are used to operate powered devices associated with the automobile. For example, the electrical switches 25, 27 may open and close windows, adjust side mirrors, or move power seats. A hidden wiring harness couples the electrical switches 25, 27 with the powered devices. The flip cover 24 has a hinged coupling with the switch panel 26.

Electrical switches 25 are accessible and electrical switches 27 are inaccessible to the passenger cabin occupant with the flip cover 24 in a closed position, as shown in FIG. 1. Electrical switches 27 are accessed by pivoting the flip cover 24 to an opened position, as shown in FIG. 2. In the opened position, electrical switches 25 are inaccessible. The electrical switches 25 may be more frequently used than electrical switches 27, which would preferably result in the flip cover 24 normally being maintained in the closed position.

Figure 3:
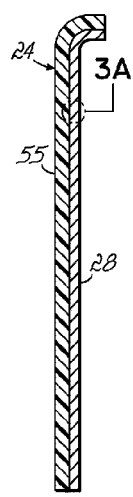
FIG. 3 is a cross-sectional view of the cover of FIG. 2.
Figure 3A:
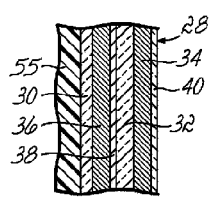
FIG. 3A is a detailed view of a portion of FIG. 3.

With reference to FIGS. 3 and 3A in which like reference numerals refer to like features in FIG. 1, the bolster 14 further includes an electroluminescent (EL) lamp 29 that is capable of emitting diffuse light for illuminating the nearby electrical switches 25. Similarly, a lower surface 17 on the underside of the flip cover 24 carries another EL lamp 28 that is capable of emitting diffuse light for illuminating the nearby electrical switches 27 when the flip cover 24 is pivoted to the opened position. Different lighting effects can be achieved by varying the position of the EL lamps 28, 29 within the flip cover 24 and bolster 14. The EL lamps 28, 29 have an identical construction that will be described below with regard to EL lamp 28 with the understanding that the description applies equally to EL lamp 29.

EL lamp 28 consists of a stacked structure of multiple layers carried on a suitable flexible structural substrate 30. The layered structure includes a layer of an EL phosphor 32 disposed between substantially parallel front and rear electrodes 34 and 36, respectively. The phosphor layer 32 is contiguous with the front electrode 34 but spaced from, and electrically isolated from, the rear electrode 36 by a dielectric layer 38. The front electrode 34, which faces into the interior of the passenger compartment, is light transmissive (i.e., transparent or translucent) for transmitting light emitted from the phosphor layer 32 when an electric field is applied between the front and rear electrodes 34, 36. The dielectric layer 38 may be pigmented to supply a dark or colored background for the emitted light.

A protective encapsulation layer 40 of a light-transmissive substance, such as polycarbonate or another polymer suitable for this application, optionally covers the front electrode 34 of the EL lamp 28. The encapsulation layer 40 may be applied to the stacked structure as a printed ink layer. An electrical connector 42, such as an edge electrical connector, includes power contacts that are coupled with the front and rear electrodes 34, 36. The power contacts of the electrical connector 42 are exposed through the encapsulation layer 40 for establishing electrical contacts. The EL lamp 29 of bolster 14 includes an electrical connector 43 similar or identical in construction and function to electrical connector 42.

The layers of the EL lamp 28 may be printed onto the substrate by rotary screen printing, flexographic printing, or other printing methods using conducting, insulating and electroluminescent ink compositions. The ink compositions are printed across a desired print area on the substrate 30, or alternatively on the encapsulation layer 40, and then dried to remove volatile solvents for forming stable layers. Some of the layers in the stacked structure may be printed more than once in order to assure proper thickness.

Phosphor ink compositions are available to emit light in many colors, such as green, blue, and yellow, and may also be blended to produce white or colored light emission. Typical EL phosphors for EL lamp 28 are comprised of inorganic zinc sulfide-based materials doped to create the desired color emission. Suitable EL phosphor ink compositions include white, blue-green and yellow-green LUX-PRINT® electroluminescent inks commercially available from DuPont Microcircuit Materials (Research Triangle Park, N.C.).

In one embodiment of the invention, a flexible metallized film may effectively function as the substrate 30, the rear electrode 36 and the dielectric layer 38 of the EL lamp 28. Such metallized films include a thin layer of a metallic conductive material, like aluminum, deposited on one side of a film material, like polyester. The deposited metallic layer operates as the rear electrode 36 and the film material acts as the dielectric layer 38. The metallized film also serves as a substrate 30 for application of the remaining printed component layers (e.g., phosphor layer 32 and front electrode 34) of the stacked structure.

Figure 1A:
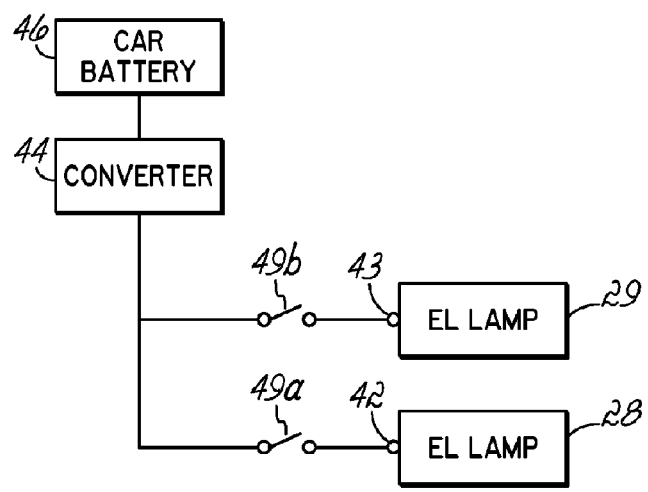
FIG. 1A is a diagrammatic view illustrating the electrical circuit for the electroluminescent lamps of the invention.

With reference to FIGS. 1 and 1A, an inverter or converter 44 electrically couples a direct current (DC) electrical system of the vehicle, which includes the car battery 46, with the electrical connectors 42, 43. The converter 44 converts the DC voltage from the electrical system to generate an alternating current (AC) driving voltage in the range of 80 to 200 VAC, preferably about 110 VAC, at a frequency in the region of 300 to 500 Hz, preferably about 400 Hz. Additional circuitry, as recognized by persons of ordinary skill in the art, may be provided as required to ensure proper operation of the EL lamps 28, 29. Application of the AC driving voltage across the front and rear electrodes 34, 36 of the EL lamps 28, 29 generates a varying electric field within the phosphor layer 32 causing the constituent phosphor particles to emit visible light. In general, the brightness of the EL lamps 28, 29 increases with increased voltage and frequency. Power to the EL lamp 28 may be switched, for example, in coordination with a switch (not shown) that closes the electrical circuit including EL lamp 28 when the flip cover 24 is pivoted to the opened position. Similarly, power to the EL lamp 29 may be switched, for example, in coordination with operation of a light switch 49 controlling vehicle lighting.

The EL lamps 28, 29 have a low power consumption and very low heat generation as compared with conventional lamps used in such automotive applications. Furthermore, the EL lamps 28, 29 are sturdy and exhibit excellent vibration and impact resistance. The EL lamps 28, 29 will have a lengthy life and will not normally need replacement over the life of the automobile, in contrast to the need to periodically replace burnt-out conventional incandescent bulbs. The resin material forming the bolster 14 and the flip cover 24 need not be heat resistant as the EL lamps 28, 29 have a cooler operating temperature than conventional incandescent bulbs.

Figure 4:
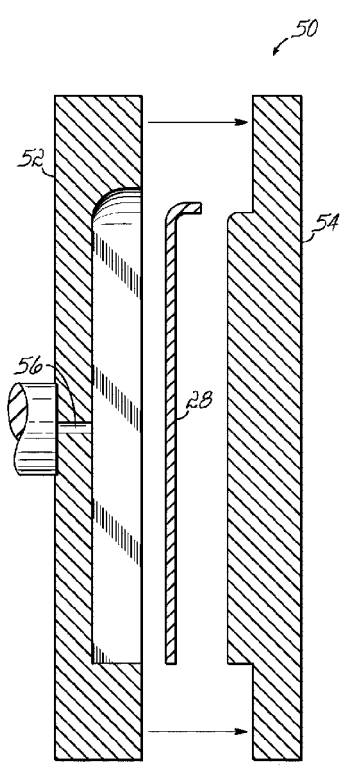
FIGS. 4-6 are diagrammatic cross-sectional views illustrating a molding process for forming the flip pack of the present invention.
Figure 5:
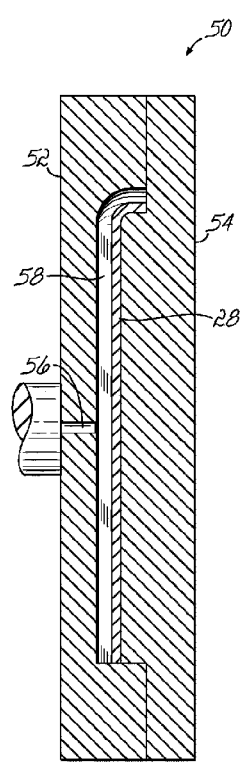
Figure 6:
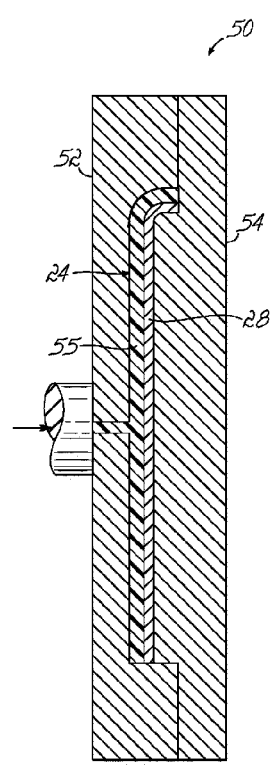

With reference to FIGS. 4-6, a method of making the flip cover 24 with the EL lamp 28 in a mold cavity 58 by an injection molding process will be described. The method will apply equally to the molding of bolster 14 and EL lamp 29, other than a change in the shape of mold cavity 58.

In FIG. 4, an injection die or mold 50 having first and second mold sections 52, 54 is provided. The EL lamp 28 is placed at a specified location between the first and second mold sections 52, 54 so that the power contacts of the electrical connector 42 (FIG. 2) are exposed after molding for establishing electrical contacts. As shown in FIG. 5, the mold 50 is closed so that the first and second mold sections 52, 54 define the mold cavity 58 having the general three-dimensional geometrical shape of the flip cover 24.

As shown in FIG. 6, molten resin material is injected by an extruder through one or more gates 56 into the mold cavity 58 and fills the space inside the cavity 58 not occupied by the EL panel 28. The synthetic resin material is selected according to the characteristics required for the flip cover 24 and may be any engineering polymer material suitable for an injection molding process. The injection molding process creates sufficient pressure and heat to bond the EL lamp 28 and the injected molten resin material to form the flip cover 24 as an integral structure. The resin material, when solidified, defines a polymer portion 55 of the bolster 14. The mold 50 is opened by separating the mold sections 52, 54 and the flip cover 24 is ejected from the mold 50 in a condition ready for delivery as a unitary component for assembly on an automotive production line.

If necessary, the flip cover 24 may then either be partially or completely vacuum-or thermo-formed to achieve a final desired shape. In this regard, the shape of the cavity in mold 50 may not reflect the three-dimensional geometrical shape of the flip cover 24 as such post injection molding processes may be used to form the final shape.

The invention also contemplates that the article formed by the injection molding process may be the entire trim panel 10 with an integral bolster 14 that includes the EL lamp 29. In this embodiment, the three-dimensional geometrical shape of the article-forming cavity of the mold 50 will reflect that of the trim panel 10 or a post injection molding process is used to shape the molded article to form the final shape of trim panel 10.

Figure 7:
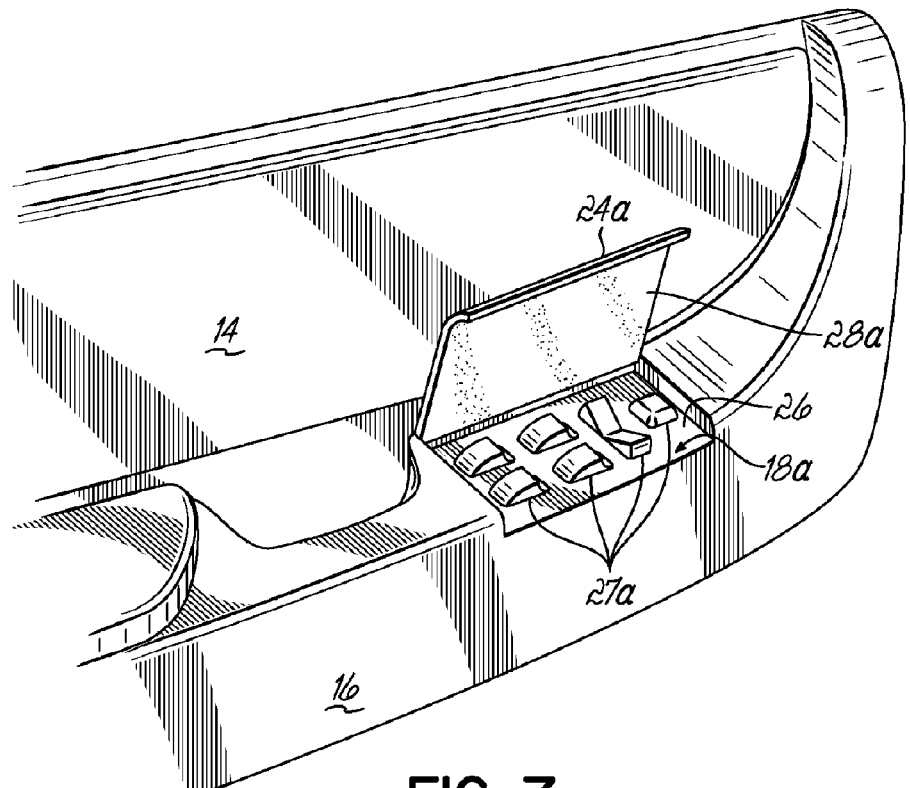
FIG. 7 is a view of a flip pack in accordance with an alternative embodiment of the invention.

With reference to FIG. 7 in which like reference numerals refer to like features in FIGS. 1-6 and in an alternative embodiment of the invention, the trim panel 10 may be provided with a flip pack 18a with a flip cover 24a that lacks the electrical switches of flip cover 24 (FIGS. 1 and 2) and a bolster 14a that lacks EL lighting, as present on the upper surface 15 of the flip cover 24 (FIG. 1), because of the absence of switches. The underside of the flip cover 24a is provided with an EL lamp 28a, identical to EL lamp 28, for illuminating the electrical switches 27 on the flip pack 18a in the opened position. The flip cover 24a may be held in the opened position by the action of a detent (not shown).

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. An automotive interior component for a vehicle door, comprising:
   a door trim panel capable of being mounted to the vehicle door, said door trim panel including a switch panel carrying at least one first electrical switch and a flip cover pivotally attached to said switch panel, said flip cover having an opened position in which said first electrical switch is accessible and a closed position in which said first electrical switch is inaccessible; and
   an electroluminescent lamp mounted to said flip cover, said electroluminescent lamp positioned for emitting visible light, when powered, to illuminate said first electrical switch on said switch panel when said flip cover is in said opened position, wherein said flip cover and said electroluminescent lamp comprise a unitary molded assembly.

2. The automotive interior component of claim 1 wherein said door trim panel further includes an arm rest supporting said switch panel.

3. The automotive interior component of claim 1 wherein said flip cover includes at least one second electrical switch, a lower surface facing said switch panel in the closed position, and an upper surface carrying said second electrical switch.

4. A method of making an automotive interior component in a mold with mold sections that form a mold cavity with a geometrical shape resembling a flip cover for a flip pack and a gate for filling the mold cavity, the method comprising:
   placing an electroluminescent lamp between the mold sections;
   closing the mold sections and injecting a molten polymer resin through the gate to fill a portion of the mold cavity unfilled by the electroluminescent lamp; and
   opening the mold sections after the molten polymer resin solidifies and ejecting the automotive interior component having the geometrical shape resembling the flip cover from the mold.

5. The method of claim 4 further comprising:
   shaping the automotive interior component after ejection from the mold to define a final shape of the flip panel.

6. An automotive interior component for a vehicle door, comprising:
   a door trim panel capable of being mounted to the vehicle door, said door trim panel including a switch panel carrying at least one first electrical switch, a flip cover pivotally attached to said switch panel, and a bolster positioned proximate to said flip cover, said flip cover having an opened position in which said first electrical switch is accessible and a closed position in which said first electrical switch is inaccessible;

a first electroluminescent lamp mounted to said flip cover, said first electroluminescent lamp positioned for emitting visible light, when powered, to illuminate said first electrical switch on said switch panel when said flip cover is in said opened position; and a second electroluminescent lamp mounted to said bolster, said second electroluminescent lamp positioned for emitting visible light, when powered, to illuminate said flip cover.

7. The automotive interior component of claim 6 wherein said flip cover includes at least one second electrical switch, a lower surface facing said switch panel in the closed position, and an upper surface carrying said second electrical switch, said second electroluminescent lamp illuminating said second electrical switch when said flip cover is in said closed position.

8. The automotive interior component of claim 6 wherein said bolster is an integrally molded portion of said door trim panel.

9. The automotive interior component of claim 6 wherein said bolster and said second electroluminescent lamp comprise a unitary molded assembly.

* * * * *